3,574,846
STABILIZATION OF HEXAMETHYLDITIN WITH
2,6-DITERTIARY-BUTYL-4-METHYL PHENOL
Herbert Q. Smith, King of Prussia, and Edward Everett
Ivy, Devon, Pa., assignors to Pennwalt Corporation
No Drawing. Filed Mar. 11, 1968, Ser. No. 711,834
Int. Cl. A01n 9/00
U.S. Cl. 424—288                                      6 Claims

ABSTRACT OF THE DISCLOSURE

A stabilized insecticidal composition comprising hexamethylditin and a stabilizing amount of 2,6-di-tertiary-butyl-4-methyl phenol.

---

The unexpected high activity of hexamethylditin as an insecticide is disclosed and claimed in application Ser. No. 538,991, filed Mar. 31, 1966 and which issued as U.S. Pat. No. 3,400,202 on Sept. 3, 1968. As with other insecticides, hexamethylditin may be formulated into solution or dispersion concentrates of the active agent in one or more common solvents normally used as a carrier. For example, hexamethylditin may be dissolved in organic liquids such as ketones (acetone, methyl ethyl ketone, etc.), amides (dimethylacetamide, dimethylformamide, etc.), aromatic hydrocarbons such as benzene, toluene, xylene, alcohols and glycols, Cellosolve (trademark), and various oxygen containing industrial organic solvents and the like. Dispersions of the active agent may be then prepared by diluting the organic solvent concentrate system with water in the presence or absence of a surface active agent.

Likewise, hexamethylditin may be formulated as dusts and powders where the inert carrier is a clay such as fuller's earth, china, clay, kaolin, attapulgite, bentonite, and related aluminum silicates. Other finely divided inorganic solids may be used and in general these will have a particle size below 200 mesh and contain from about 0.5 to 25% by weight active agent. These formulations are sprayed or dusted in the usual manner onto the particular substrate to be protected against insect attack.

It has been observed, however, that when such formulations are prepared they may be used with excellent results, but after standing for a prolonged period activity decreases and in fact disappears after about 3 months. It has now been found that hexamethylditin may be stabilized so that little or no loss of activity results from storage by incorporating with it a stabilizing amount of 2,6-di-tertiary-butyl-4-methylphenol. It is to be understood that the stabilizing agent may be added directly to the hexamethylditin before formulation or it may be added to the already formulated solid carrier or concentrate containing the insecticidal composition.

It is not known how the stabilizing agent functions in this invention. Although 2,6 - di-tertiary-butyl-4-methylphenol is a known antioxidant, its preparation being disclosed in U.S. Pat. No. 2,428,745, related antioxidants and antiozonants are not effective in stabilizing hexamethylditin.

The stabilizing amount of agent which will be used in the formulation is not critical, but will generally be in the order of from about 0.5% to about 10% by weight of the total formulation. Preferably from 1 to 5% by weight will be used.

In order to illustrate the invention the following tests were carried out:

Formulations comprising a liquid carrier, hexamethylditin as active insecticide, and a surfactant of the alkyl aryl polyether alcohol type (Triton X155) were prepared and stored at room temperature over a period of time in one test and, in the second test, subjected to accelerated aging by storing at 130° F. Activity of formulations was determined by determining the percent kill of mosquito larvae at 0.1 p.p.m. The test used was that disclosed in Example I of Ser. No. 538,991, now U.S. Pat. No. 3,400,-202. The following table indicates the results obtained.

TABLE I

| | Percent | | | Time of storage, days | Percent kill of mosquito larvae tested at 0.1 p.p.m., stored at— | |
|---|---|---|---|---|---|---|
| Hexamethylditin | Test agent, BHT[1] | Xylene | Surfactant, Triton X 155 | | Room temperature[2] | 130° F.[2] |
| 10 | 0 | 85 | 1 | 88 | 0, 0 | 0, 0 |
| 10 | 1 | 88 | 1 | 88 | 95, 90 | 100, 90 |
| 10 | 5 | 84 | 1 | 88 | 90, 80 | 90, 95 |
| 10 | 10 | 79 | 1 | 88 | 90, 75 | 75, 90 |
| 10 | 10 | 79 | 1 | 118 | 90, 70 | 90, 100 |

[1] 2,6-di-tertiary-butyl-4-methylphenol is often referred to as BHT, meaning butylated hydroxytoluene.
[2] Two replicates.

As can be seen from the above data, BHT is surprisingly effective in maintaining activity of the insecticide.

The following table indicates the failure of various other known antioxidants as stabilizers.

TABLE II

| | Percent | | | Days held | Percent kill of mosquito larvae at 0.1 p.p.m., stored at— | |
|---|---|---|---|---|---|---|
| Hexamethylditin | Agent tested | Xylene | Surfactant | | Room temperature | 130° F. |
| 10 | (1) | 79 | 1 | 20 | 0.0 | 0.0 |
| 10 | (2) | 79 | 1 | 20 | 0.0 | 0.0 |
| 10 | (3) | 79 | 1 | 20 | 0.0 | 0.0 |

[1] Propyl gallate (10).
[2] Butylated hydroxyanisole (10).
[3] Dihydrocoumarin (10).

As can be seen from the data, none of the above antioxidants or antiozonants are as effective as BHT and even the related butylated hydroxy anisole (BHA) which differs only by having a methoxy group instead of hydroxy is not effective as a stabilizer.

In another evaluation, a solid carrier formulation was prepared with and without BHT and its activity determined after storage. The following table indicates the results of these tests:

TABLE III
[Formulations of 10% hexamethylditin and clay]

| Antioxidant (percent) | Percent clay | Storage time, days | Percent kill of mosquito larvae at 1 p.p.m., storage at— | |
|---|---|---|---|---|
| | | | Room temp. | 54° C. |
| None | 90 | 20 | 0, 0 | 0, 0 |
| BHT (10) | 80 | 20 | 90, 95 | 90, 85 |
| Propyl gallate (10) | 80 | 20 | 0, 0 | 0, 0 |
| Butylated hydroxyanisole (10) | 80 | 20 | 0, 0 | 0, 0 |
| Dihydrocoumarin (10) | 80 | 20 | 0, 0 | 0, 0 |

As can be seen from Table III the BHT is quite effective in retaining the activity of the hexamethylditin.

The preferred application of the invention will be to organic solvent concentrates of hexamethylditin which are stored and made into aqueous dispersions just prior to use. In preparing such concentrates it is also preferable to use components which are essentially devoid of water, since it has been observed that the presence of water may have a detrimental effect.

Another unexpected and desirable effect obtained from the stabilized and insecticidal compositions of the invention is decreased phytotoxicity when the insecticidal composition is used on plants. The unstabilized material when applied to plants frequently causes a phytotoxic effect. An insecticide for plant use should, of course, not be injurious to the plants on which it is sprayed. It has been observed that the stabilized insecticidal compositions of this invention cause little or no phytotoxic effects and this is illustrated with the following data:

TABLE IV
[Cotton plants sprayed at rate of 1 pound per acre with xylene formulation containing 10% hexamethylditin and 1% surfactant (Triton X-155)]

| Percent BHT in formulation | Days aging before use | Injury to plants observed on indicated days after treatment | | |
|---|---|---|---|---|
| | | 2 | 3 | 6 |
| None | 25 | Severe | Severe | Severe. |
| 10 | 56 | None | None | Slight. |
| 1 | 25 | do | do | Do. |

It will be understood from the above description and examples of the invention that numerous variations and changes may be made without departing from the spirit and scope of the invention.

We claim:
1. A stabilized insecticidal composition comprising hexamethylditin and a stabilizing amount of 2,6-di-tertiary-butyl-4-methyl phenol.
2. A stabilized insecticidal composition comprising hexamethylditin, an inert insecticidal carrier and a stabilizing amount of 2,6-ditertiary-butyl-4-methyl phenol.
3. A composition as in claim 2 wherein the inert insecticidal carrier is an inert, organic solvent.
4. A composition as in claim 2 wherein the inert insecticidal carrier is an inert inorganic solid.
5. A composition as in claim 2 wherein the stabilizer is present in an amount from about 0.5 to about 10% by weight of the total composition.
6. A composition as in claim 4 wherein the inert inorganic solid has a particle size below 200 mesh.

References Cited
UNITED STATES PATENTS

| 3,097,128 | 7/1963 | Sprinkle et al. | 424—346 |
| 3,400,202 | 9/1968 | Smith et al. | 424—288 |

ALBERT T. MEYERS, Primary Examiner

V. D. TURNER, Assistant Examiner

U.S. Cl. X.R.

260—429.7